United States Patent
Narayanan et al.

(10) Patent No.: US 7,035,640 B2
(45) Date of Patent: Apr. 25, 2006

(54) METHOD FOR IMPROVING THE RELIABILITY OF LOW LATENCY HANDOFFS

(75) Inventors: Vidya Narayanan, Schaumburg, IL (US); George Popovich, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 12 days.

(21) Appl. No.: 10/438,402

(22) Filed: May 15, 2003

(65) Prior Publication Data

US 2004/0229612 A1 Nov. 18, 2004

(51) Int. Cl.
*H04Q 7/20* (2006.01)

(52) U.S. Cl. .................................. 455/436

(58) Field of Classification Search ............. 455/435.1, 455/436; 713/200
See application file for complete search history.

(56) References Cited

U.S. PATENT DOCUMENTS

| | | | |
|---|---|---|---|
| 2003/0104814 A1* | 6/2003 | Gwon et al. ................ | 455/436 |
| 2003/0125027 A1* | 7/2003 | Gwon et al. ................ | 455/436 |
| 2004/0003280 A1* | 1/2004 | Narayanan et al. ......... | 713/200 |
| 2004/0137902 A1* | 7/2004 | Chaskar et al. ............. | 455/436 |
| 2004/0166857 A1* | 8/2004 | Shim et al. ................. | 455/436 |

* cited by examiner

*Primary Examiner*—William D. Cumming
(74) *Attorney, Agent, or Firm*—Terri S. Hughes; Indira Saladi

(57) ABSTRACT

A first device (104) receives a first message from a second device (100). Upon receipt of the first message, the first device transmits a registration request to the second device for pre-registration with a third device (102). If the second device does not receive the registration request from the first device within a predetermined time period, the second device re-transmits the first message to the first device if a communication link with the first device is still operational. If the first device receives the first message again from the second device prior to attaching to the third device, the first device re-transmits the registration request to the second device. If registration with the third device is not pending when the first device attaches to the third device, the third device transmits a second message to the first device to solicit a registration request from the first device.

17 Claims, 4 Drawing Sheets

METHOD FOR IMPROVING THE RELIABILITY OF LOW LATENCY HANDOFFS

FIELD OF INVENTION

The present invention relates generally to a method for improving the reliability of low latency handoffs.

BACKGROUND OF THE INVENTION

Today, developers are focused more on providing all Internet Protocol ("IP") solutions to roaming nodes (e.g., radios, telephones, laptops, personal digital assistants, etc.). As such, it is necessary to have a seamless IP-based mobility solution. Seamless mobility for mobile nodes from one location to another is hence becoming increasingly important. Thus, fast and reliable handoffs for the mobile node are becoming more important.

One of the ways to achieve low latency handoffs is to make use of layer 2 triggers to perform layer 3 handoffs. A pre-registration technique has been proposed in an Internet Draft to address low latency handoffs. The pre-registration technique exploits early triggers from the link layer that indicate a handoff is going to occur. The pre-registration technique uses this early trigger to start the mobile IP registration process from the mobile node's first foreign agent (i.e., current point of attachment), even though the registration itself is for a second foreign agent (i.e., new point of attachment). This early launch of the mobile IP registration process helps reduce overall handoff delay since more time is provided for the mobile IP registration to complete. As illustrated in FIG. 1, the first foreign agent 100 acts as a proxy for the second foreign agent 102 so that the mobile node 104 and the first foreign agent 100 can exchange messages on behalf of the second foreign agent 102. It is important to note that the first foreign agent does not generate the messages. The first foreign agent 100 simply relays the messages to and from the mobile node 104.

A disadvantage of the pre-registration technique as described in the Internet draft is that it relies on control signaling between the mobile node 104 and the first foreign agent 100 after the link layer has indicated that a handoff is imminent. In other words, the quality of the air interface link between the mobile node 104 and the first foreign agent 100 is likely deteriorating rapidly. The deterioration of the link between the mobile node 104 and the first foreign agent 100 increases the likelihood of dropped messages. Under these conditions, it may not always be possible for the mobile node 104 to complete the pre-registration process prior to the "link down" with the first foreign agent 100 (e.g., the mobile node 104 may be moving too fast). Under the Internet Draft, when pre-registration fails, the handoff time is longer than with standard mobile IP. This shortcoming makes the pre-registration techniques as described in the Internet draft less than desirable, especially for mission critical applications.

Further, in the case of a pre-registration failure, one of the following needs to occur before the mobile node 104 can perform a mobile IP registration: either the registration request timer expires and the mobile node 104 solicits another agent advertisement from the second foreign agent 102, or the second foreign agent 102 transmits its regular periodic agent advertisement. A disadvantage to this technique is that both of these events could take in the order of a second to occur, which would significantly slow the handoff process.

Alternatively, the mobile node 104 could always transmit an agent solicitation upon "link up" with the second foreign agent 102, and transmit a registration request to the home agent 106 upon receiving the advertisement. If the home agent 106 already has the care of address registered, the home agent 106 would simply refresh the state and send a reply. A disadvantage to this technique is that the number of registration requests could potentially double, which may lead to home agent 106 loading issues. Another disadvantage to this technique is wasted resources in case where the pre-registration succeeds.

Thus, there exists a need to perform certain enhancements to the mobile IP low latency handoffs in order to make it suitable for mission critical applications.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
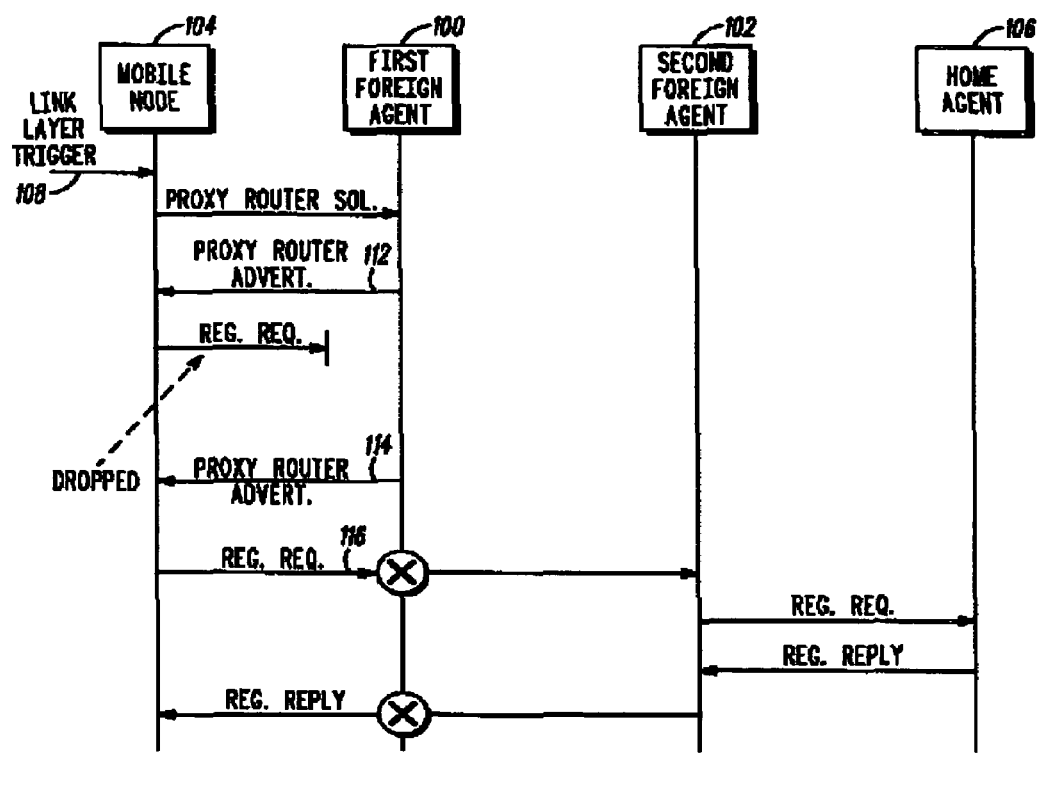
FIG. 1 illustrates a bounce diagram of the signaling between a mobile node, a first foreign agent, a second foreign agent, and a home agent.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention modifies the signaling algorithms in the mobile node 104, the current point of attachment 100, and the new point of attachment 102 from the Internet Draft to address the shortcomings of the pre-registration technique as described above. It should be noted that in accordance with the preferred embodiment of the present invention, the signaling changes in the current point of attachment 100 are required prior to "link down" with the mobile node 104, and the signaling changes in the new point of attachment 102 are required after "link up" with the mobile node 104. It is also important to note that the signaling outlined below with respect to FIGS. 1–4 occurs in parallel. Let us now turn to the details and figures of the present invention.

As in standard mobile IP applications, upon "link up", the mobile node 104 solicits agent advertisements; in other words, the mobile node 104 determines if any mobile IP agents (home agent or foreign agent) are on the same network. If the mobile node 104 is on its home network, the mobile node 104 will receive the agent advertisement from its home agent 106. Upon receiving the agent advertisement from its home agent 106, the mobile node 104 transmits a registration request to its home agent 106. The home agent 106 transmits a registration reply to the mobile node 104 indicating a successful registration with the home agent 106.

When on the home network, the mobile node 104 actually de-registers with the home agent 106 if it has previously registered since the home agent 106 does not need to tunnel any packets to the mobile node 104 via foreign agents.

If the mobile node 104, however, is on a network away from home, the mobile node 104 will receive the agent advertisement from a foreign agent 100 on the "visiting" network. Upon receipt of the agent advertisement from the foreign agent 100 on the "visiting" network, the mobile node 104 transmits the registration request to the home agent 106 via the foreign agent 100. Upon receipt of the registration request, the home agent 106 transmits a registration reply to the mobile node 104 indicating a successful registration with the foreign agent 100. At this point, for purposes of the following discussion, let us assume that the mobile node 104 has successfully registered with, and thus is currently attached to, the foreign agent 100.

Let us now assume that the mobile node 104 begins to move away from the first foreign agent (i.e., its current point of attachment) 100 towards a second foreign agent (i.e., its future point of attachment) 102. It is desirable for the mobile node 104 to begin pre-registration with the second foreign agent 102 upon notice of a handoff to reduce latency. As illustrated in FIG. 1, if the mobile node 104 receives a trigger that a handoff is about to occur, the mobile node 104 transmits a proxy router solicitation message to the first foreign agent 100; the proxy router solicitation message solicits the first foreign agent 100 for the address of the second foreign agent 102. In return, the mobile node 104 receives a proxy router advertisement from the first foreign agent 100 comprising the address of the second foreign agent 102. Alternatively, if the first foreign agent 100 receives the trigger 108 that a handoff is about to occur, rather than the mobile node 104, the first foreign agent 100 transmits the proxy router advertisement to the mobile node 104 without requiring the mobile node 104 to transmit the proxy router solicitation message. In the preferred embodiment, the link layer triggers the network layer that the handoff is imminent, however, the trigger can alternatively be implemented at other layers as well.

Figure 2:
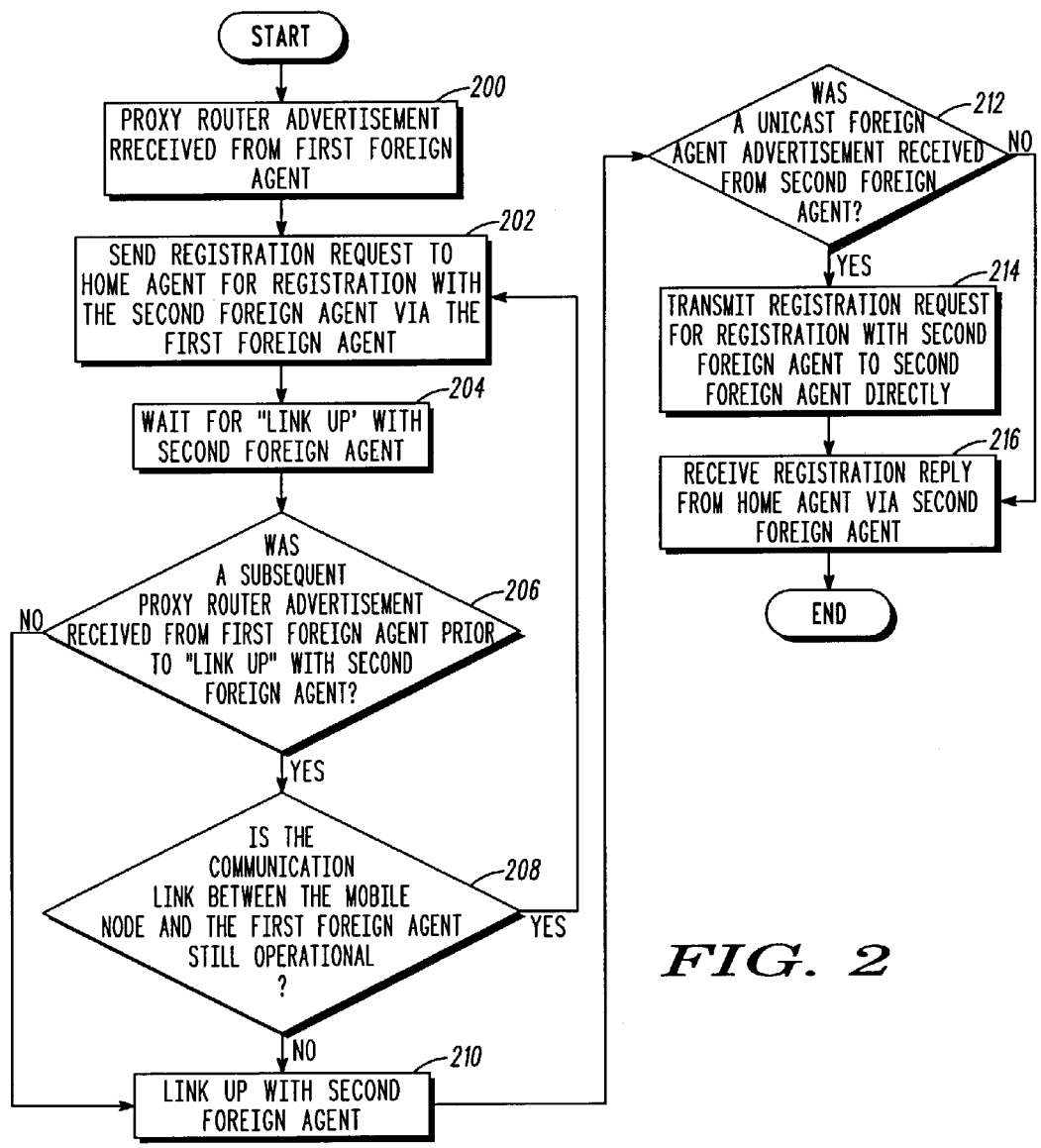
FIG. 2 illustrates a flowchart of the signaling transmitted and/or received by the mobile node in accordance with the preferred embodiment of the present invention.

FIG. 2 illustrates a flowchart of the signaling transmitted and/or received by the mobile node 104 in accordance with the preferred embodiment of the present invention. Upon receipt of the proxy router advertisement from the first foreign agent 100 (at step 200), the mobile node 104 transmits a registration request to the home agent 106 for registration with the second foreign agent 102 via the first foreign agent 100 (at step 202) and waits for "link up" with the second foreign agent 102 (at step 204).

If the mobile node 104 receives a subsequent proxy router advertisement 114 from the first foreign agent 100 prior to "link up" with the second foreign agent 102 (at step 206), it is assumed that the first foreign agent 100 did not receive the registration request from the mobile node 104. As a result, the mobile node 104 determines the status of the communication link between the mobile node 104 and the first foreign agent 100 (at step 208). If the mobile node 104 determines that the communication link with the first foreign agent 100 has deteriorated (i.e., the communication link between the mobile node 104 and the first foreign agent 100 is no longer operational), the mobile node 104 no longer attempts to communicate wit the first foreign agent 100, and waits, for a "link up" with the second foreign agent 102 (at step 210).

If the mobile node 104, however, determines that the communication link with the first foreign agent 100 is still operational (at step 208), the mobile node 104 retransmits the registration request 116 to the home agent 106 for registration with the second foreign agent 102 via the first foreign agent 100 (at step 202) and continues to wait for "link up" with the second foreign agent 102 (at step 204). It is important to note that, in accordance with the present invention, as long as the communication link between the mobile node 104 and the first foreign agent 100 is operational, the mobile node 104 will retransmit its registration request 116 for registration with the second foreign agent 102 via the first foreign agent 100 upon receipt of a proxy router advertisements 112, 114 from the first foreign agent 100.

Upon "link up" at the second foreign agent 102 (at step 210), the mobile node 104 waits idly until it receives a registration reply from the second foreign agent 102 indicating a successful registration with the second foreign agent 102. If the mobile node 104 receives a unicast foreign agent advertisement message (addressed directly to the mobile node 104) from the second foreign agent 102 while waiting for the registration reply from the home agent via the second foreign agent 102 (at step 212), the mobile node 104 transmits its registration request to the home agent 106 for registration with the second foreign agent 102 via the second foreign agent 102 directly (at step 214), and continues to wait to receive the registration reply. In the preferred embodiment of the present invention, the mobile node 104 should only receive the unicast foreign agent advertisement for registration with the second foreign agent 102 from the second foreign agent 102 if the second foreign agent 102 did not receive the registration request from the mobile node 104 (i.e., the first foreign agent 100 did not successfully receive and/or forward the previous registration request for registration with the second foreign agent 102 from the mobile node 104).

Upon receipt of the registration reply (at step 216), the mobile node 104 is successfully registered with the second foreign agent 102; as a result, subsequent communication with the mobile node 104 is routed through the second foreign agent 102.

Thus, the present invention reduces latency in handoffs by allowing the mobile node 104 to recognize the reception of subsequent (extra) proxy muter advertisements 114 from the first foreign agent 100 as an indication that the first foreign agent 100 has not yet received the registration request from the mobile node 104 (possibly due to the registration request being lost due to the communication link rapidly deteriorating, high error rate, or the like). Once attached to the second foreign agent 102, the mobile node 104 can also recognize the reception of an unsolicited unicast foreign agent advertisement from the second foreign agent 102 as an indication that another registration request for registration with the second foreign agent 102 needs to be transmitted. Thus, the mobile node 104 is able to retransmit its registration request, when requested, for registration with the second foreign agent 102 as soon as possible.

Figure 3:
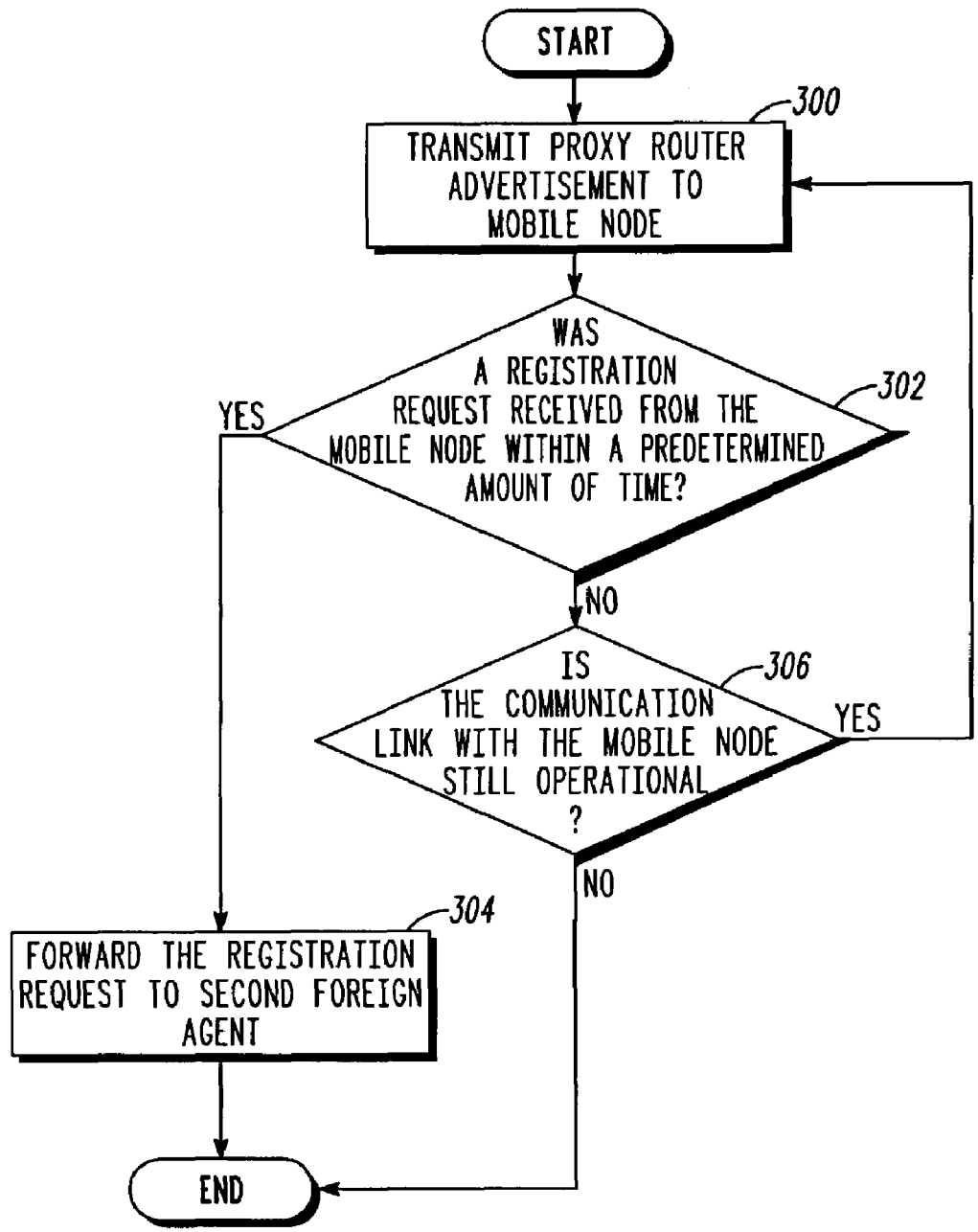
FIG. 3 illustrates a flowchart of the signaling transmitted and/or received by the first foreign agent in accordance with the preferred embodiment of the present invention.

FIG. 3 illustrates a flowchart of the signaling transmitted and/or received by the first foreign agent 100 in accordance with the preferred embodiment of the present invention. As noted above, the signaling illustrated in FIG. 3 is being performed in parallel with the signaling illustrated in FIG. 2. Starting with discovery that a handoff with the mobile node 104 is imminent, the first foreign agent 100 transmits a proxy router advertisement 112 to the mobile node 104 comprising at least the address of the second foreign agent 102 (at step 300). Upon transmission of the proxy router advertisement 112, the first foreign agent 100 waits to receive a registration request from the mobile node 104 for registration with the second foreign agent 102. If the registration request is received from the mobile node 104 (at step 302), the first foreign agent 100 forwards the request to the second foreign agent 102 (at step 304).

If the registration request, however, is not received from the mobile node 104 within a predefined period of time after transmitting the proxy router advertisement 112 (at step 302), the first foreign agent 100 determines whether the communication link with the mobile node 104 is still operational (at step 306). If the communication link is no longer operational, the first foreign agent 100 no longer attempts to communicate with the mobile node 104. If, however, the communication link is still operational with the mobile node 104, the first foreign agent 100 retransmits the proxy router advertisement 114 (at step 300). It should be noted that, in accordance with the present invention, the first foreign agent 100 will continue to retransmit its proxy router advertisement 114 to the mobile node 104 until a registration request for registration with the second foreign agent 102 is received from the mobile node 104, or until the communication link with the mobile node 104 is no longer operational, whichever is sooner.

Thus, the present invention reduces latency in handoffs by setting a timer in the first foreign agent 100. If the first foreign agent 100 does not receive the registration request for registration with the second foreign agent 102 from the mobile node 104 prior to expiration of the timer, the first foreign agent 100 transmits a subsequent proxy router advertisement 114 to the mobile node 104 to facilitate the pre-registration prior to handoff. Thus, the first foreign agent 100 informs the mobile node 104 that it has not received its registration request during the time frame in which it was expected.

Figure 4:
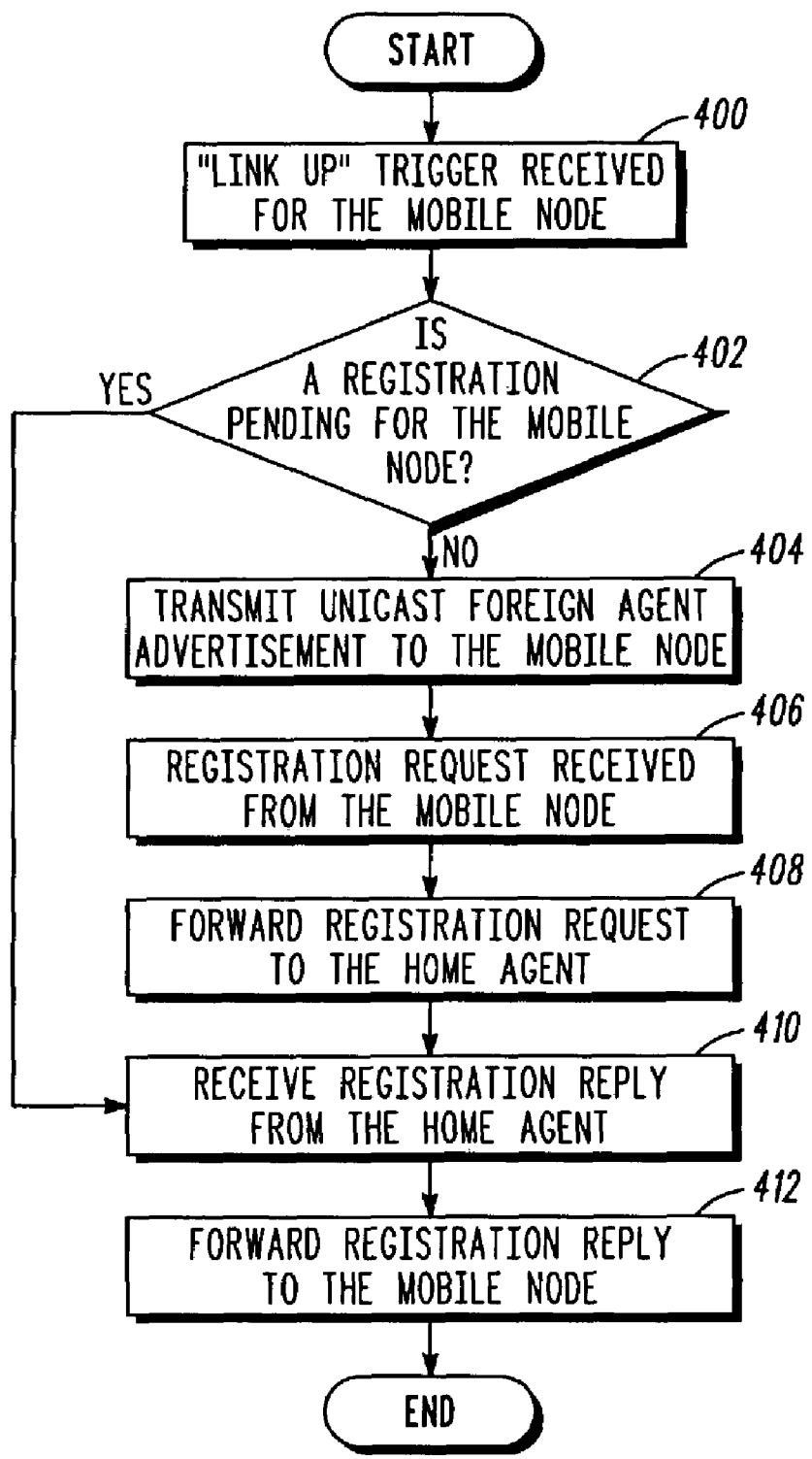
FIG. 4 illustrates a flowchart of the signaling transmitted and/or received by the second foreign agent in accordance with the preferred embodiment of the present invention.

FIG. 4 illustrates a flowchart of the signaling transmitted and/or received by the second foreign agent 102. Again, as stated above, the signaling illustrated in FIG. 4 is performed in parallel with the signaling illustrated in FIG. 2. Starting with the mobile node 104 attaching to the second foreign agent 102, the second foreign agent 102 receives a "link up" trigger identifying attachment of a new mobile node 104 (at step 400). Upon receipt of the "link up" trigger, the second foreign agent 102 determines whether a registration is pending for the mobile node 104 (at step 402). If registration is currently pending for the mobile node 104, the second foreign agent 102 waits to receive a registration reply from the home agent 106 (at step 410). The second foreign agent 102 will eventually receive a registration reply from the home agent 106 indicating that the mobile node's registration with the second foreign agent 102 is successful, in which the second foreign agent 102 forwards the registration reply to the mobile node 104 (at step 412).

If registration, however, is not currently pending for the mobile node 104 (i.e., the second foreign agent 102 never received the forwarded registration request for the mobile node 104), the second foreign agent 102 transmits an unsolicited unicast foreign agent advertisement to the mobile node 104 (at step 404). In response to transmitting the foreign agent advertisement, the second foreign agent 102 waits to receive the registration request for registration with the second foreign agent 102 from the mobile node 104. Upon receipt of the registration request (at step 406), the second foreign agent 102 forwards the registration request to the home agent 106 (at step 408). The second foreign agent 102 will eventually receive a registration reply from the home agent 106 indicating that the mobile node's registration with the second foreign agent 102 is successful (at step 410), in which the second foreign agent 102 forwards the registration reply to the mobile node 104 (at step 412).

It should be noted that if by chance the second foreign agent 102 receives the registration reply for the mobile node 104 from the home agent 106 prior to the mobile node 104 "linking up" with the second foreign agent 102, the second foreign agent 102 buffers the registration reply until "link up" by the mobile node 104. The second foreign agent 102 buffering the registration reply does not slow down the handoff because layer 2 handoff needs to be completed before any information can be transmitted to and/or received from the mobile node 104 via the second foreign agent 102. Rather, buffering the registration reply until the mobile node 104 "links up" with the second foreign agent 102 increases the likelihood that the reply will not get lost due to a communication link deterioration, high error rates, or the like.

Thus, the present invention reduces latency in handoffs by allowing the second foreign agent 102 to transmit an unsolicited unicast foreign agent advertisement directly to the mobile node 104 upon attachment by the mobile node 104 if the second foreign agent 102 does not already have a registration pending for the newly attached mobile node 104. Further, the present invention reduces latency in handoffs by preferring that only the second foreign agent 102 transmits the registration reply to the mobile node 104 after the mobile node 104 "links up" at the second foreign agent 102; the second foreign agent 102 transmitting the registration reply, as opposed to the first foreign agent 100, minimizes the risk of the registration reply getting lost.

The present invention can be implemented in hardware, firmware and/or software. For example, a storage medium having stored thereon a set of instructions which, when loaded into a hardware device (e.g., a microprocessor), causes the hardware device/communication device to perform the functions of the present invention. Such a hardware device is located at the mobile node, the first foreign agent and/or the second foreign agent as one such means to implement the present invention.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for improving the reliability of a low latency handoff, the method comprising the steps of:
   receiving a first message from a first device;
   upon receipt of the first message, transmitting a registration request to the first device for pre-registration with a second device; and
   if the first message is received again from the first device prior to attaching to the second device, re-transmitting the registration request to the first device.

2. The method of claim 1 wherein the first message is a proxy router advertisement message.

3. The method of claim 1 further comprising the steps of:
   attaching to the second device;
   receiving a second message from the second device; and upon receipt of the second message, transmitting the registration request to the second device.

4. The method of claim 3 wherein the second message is a unicast foreign agent advertisement.

5. The method of claim 1 further comprising the steps of:
attaching to the second device; and
receiving a second message from the second device indicating a successful registration with the second device.

6. The method of claim 1 wherein the steps of receiving, transmitting and re-transmitting are stored on a storage medium, which when loaded into a hardware device, causes the hardware device to perform the steps of receiving, transmitting and re-transmitting.

7. The method of claim 1 wherein the first device and the second device is one of a home agent and a foreign agent.

8. A method for improving the reliability of a low latency handoff, the method comprising the steps of:
transmitting a message to a first device;
if a registration request for pre-registration with a second device was not received from the first device within a predetermined time period after the step of transmitting, re-transmitting the message to the first device if a communication link with the first device is still operational; and
if the registration request was received from the first device within the predetermined time period, forwarding the registration request to the second device.

9. The method of claim 8 wherein the message is a proxy router advertisement message.

10. The method of claim 8 wherein the first device is a mobile node, and wherein the second device is one of a foreign agent and a home agent.

11. The method of claim 8 wherein the steps of transmitting, re-transmitting and forwarding are stored on a storage medium, which when loaded into a hardware device, causes the hardware device to perform the steps of transmitting, re-transmitting, and forwarding.

12. A method for improving the reliability of a low latency handoff, the method comprising the steps of:
receiving a trigger that an attachment has occurred from a first device;
determining whether a registration is pending for the first device;
if the registration for the first device is not pending upon receiving the trigger, transmitting a message to the first device to solicit a registration request from the first device; and
if the registration for the first device is pending, waiting to receive an indication of a successful registration from a second device.

13. The method of claim 12 further comprising the steps of:
receiving the indication of a successful registration from the second device; and
forwarding the indication of the successful registration to the first device.

14. The method of claim 12 wherein the message is a unicast foreign agent advertisement message to the first device.

15. The method of claim 12 further comprising the steps of, if the registration for the first device is not pending, receiving a registration request from the first device, and forwarding the registration request to the second device.

16. The method of claim 12 wherein the first device is a mobile node, and wherein the second device is a home agent for the first device.

17. The method of claim 12 wherein the steps of receiving, determining, transmitting, and waiting are stored on a storage medium, which when loaded into a hardware device, causes the hardware device to perform the steps of receiving, determining, transmitting, and waiting.

* * * * *

UNITED STATES PATENT AND TRADEMARK OFFICE
CERTIFICATE OF CORRECTION

| | |
|---|---|
| PATENT NO. | : 7,035,640 B2 |
| APPLICATION NO. | : 10/438402 |
| DATED | : April 25, 2006 |
| INVENTOR(S) | : Narayanan et al. |

It is certified that error appears in the above-identified patent and that said Letters Patent is hereby corrected as shown below:

In column 4, line 42, change "muter," to --router--

Signed and Sealed this

Seventh Day of November, 2006

JON W. DUDAS
*Director of the United States Patent and Trademark Office*